April 16, 1968
J. W. COLTON ET AL  3,378,467
METHOD OF RECOVERING UNSATURATED MONOMER BY THIN FILM EVAPORATION WITH A GAS AND ABSORPTION WITH A SOLVENT
Filed May 20, 1964
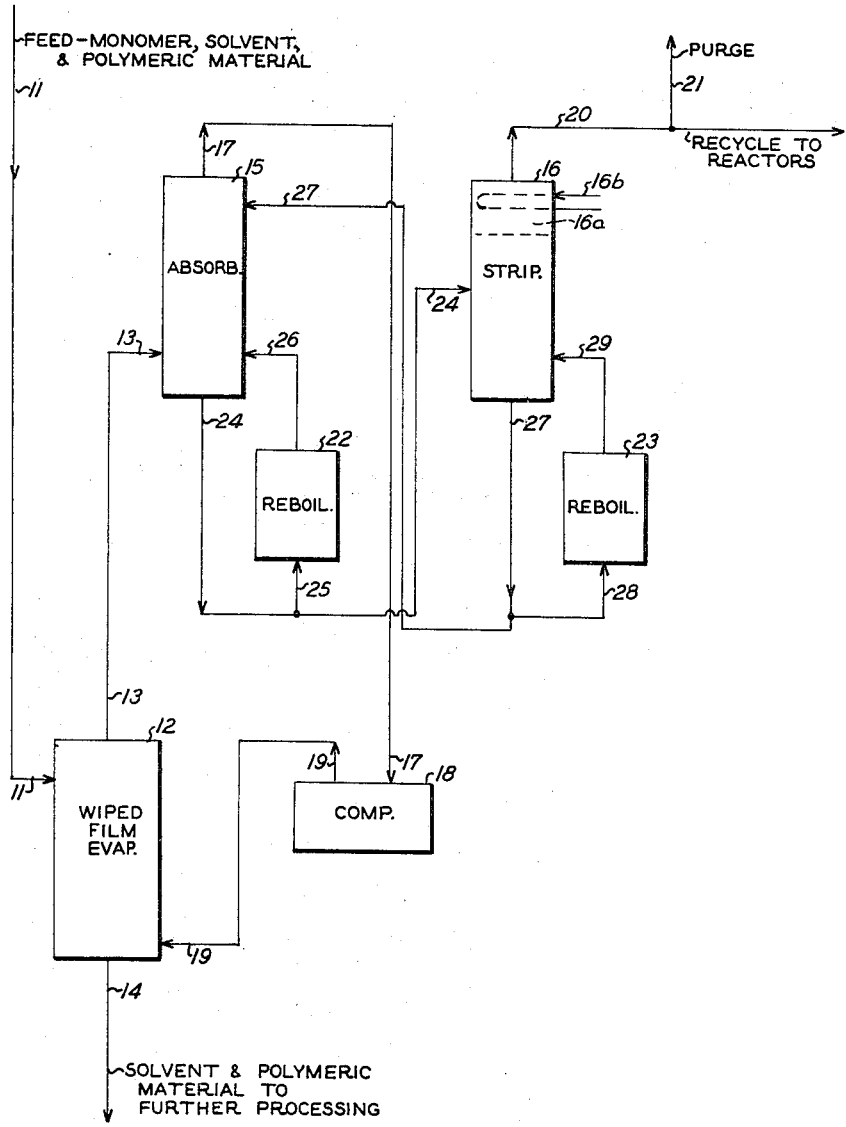
INVENTORS
*JOHN W. COLTON*
*JOSEPH E. JEWETT, JR.*
BY *William C. Long*
ATTORNEY

United States Patent Office 3,378,467
Patented Apr. 16, 1968

3,378,467
METHOD OF RECOVERING UNSATURATED MONOMER BY THIN FILM EVAPORATION WITH A GAS AND ABSORPTION WITH A SOLVENT
John White Colton, Pelham Manor, and Joseph E. Jewett, Jr., Larchmont, N.Y., assignors to Halcon International, Inc., a corporation of Delaware
Filed May 20, 1964, Ser. No. 368,830
10 Claims. (Cl. 203—42)

This invention relates to the preparation of homopolymers, copolymers, terpolymers and the like polymeric materials by processes which are characterized as "solution" polymerizations, e.g., wherein polymerization takes place in a homogeneous mixture resulting in a mixture of monomer or monomers, polymeric material, and solvent. More particularly, it relates to recovery of unreacted monomers from such a polymerization reaction mixture using a thin-film evaporization system. It relates especially to such a process using a solvent-saturated inert gas sweep flowing countercurrently to a thin-film of polymer solution, whereby the partial pressures of monomers are relatively high at the inlet part but relatively low at the outlet part of the flowing film, in combination with absorbing and stripping for recovering monomer from the sweep gas.

Numerous polymeric materials such as homopolymers, copolymers, terpolymers and the like can be made by reaction of single olefins or combinations of alpha-olefins such as ethylene, propylene, 1-butene, 1-pentene, 1-hexene, and the like, and optionally also including one or more, diolefins, such as butadiene, cyclopentadiene, and dicyclopentadiene. These polymeric materials may be prepared in the presence of solvents such as n-hexane, n-heptane, n-octane, benzene, cyclohexane, carbon tetrachloride, and the like. Polymerization temperatures range from 30° to 150° C. depending on the material being polymerized and the molecular weight desired. Pressures vary from near atmospheric to 2,000 atmospheres. Polymerization takes place in the presence of metalloalkyl compounds, such as $Al(C_6H_{13})_3$, $Al(C_2H_5)_2Cl$, $Al(i-C_4H_9)_3$, $Zr(C_4H_9)_4$, $Zr(i-C_3H_7)_4$, $Ti(C_6H_{13}O)_4$ plus a soluble compound of a transition metal in Groups IV–VI of the Periodic System, e.g., $TiCl_2$, $TiCl_3$, $TiCl_4$, $VCl_4$ $VOCl_3$, and the like.

After the polymerization reaction is carried to the desired extent, it is stopped in usual manner and the reaction mixture is processed to recover unreacted monomer, solvent, and then the said polymeric materials. Monomers may be evaporated or distilled off as may the solvent. After removal of the monomers, the mixture may be suspended in water and stripped with steam to leave the polymer as a crumb. The crumb may be processed in usual manner as is customary in rubber technology.

The efficient removal of unreacted monomer or monomers from the monomer-polymer-solvent solution is important for two main reasons. First, depending on the extent of unreacted monomer remaining, economical operation may demand recycle of the monomer. Secondly, complete removal of the unreacted monomer or monomers is necessary to obviate processing difficulties in the subsequent steam stripping operation. Conventional distillation results in substantial yield loss of heat-sensitive polymer. The art is confronted with the problem of providing an efficient and economical process for the removal and recovery of these monomers.

The discoveries associated with the invention and relating to the solution of the above problems, and the objects achieved in accordance with the inventions as set forth herein include the provision of:

A process for recovering unreacted monomer from a liquid solution of a polymeric material in an inert solvent containing unreacted monomer, which process comprises vaporizing said monomer from a wiped-film of said solution while said film is swept by a counter current flow of inert gas substantially saturated with said solvent, and separating the monomer from the resulting gas mixture;

Such a process wherein the inert gas is nitrogen and the gas mixture flow rate is in the range of 0.25 to 1.50 standard cubic feet per lb. of solvent plus polymeric material, the ratio of solvent being in the range of 3.0 to 6.0 parts by weight per part of polymeric material;

Such a process wherein the unreacted monomer mixture contains about 1 to 5% ethylene;

Such a process wherein the monomer is separated from the gas mixture by absorption in an inert liquid solvent;

Such a process wherein the solvent is the same as that in the initial solution of polymeric material;

Such a process wherein monomer is recovered from the rich absorption liquor by stripping;

Such a process wherein the lean absorption liquor is recycled to the absorption step;

Such a process wherein the monomer removed is a mixture of ethylene and propylene, the solvent is n-heptane and the polymeric material is a copolymer of ethylene and propylene;

Such a process wherein the monomer removed is 1-3 butadiene, the solvent is benzene and the polymeric material is cis 1-4 polybutadiene;

Such a process wherein the monomer removed is a mixture of ethylene and 1-butene, the solvent is cyclohexane and the polymeric material is a terpolymer of ethylene, 1-butene and dicyclopentadiene;

Such a process wherein the monomer removed is a mixture of ethylene, propylene and butene, the solvent is octane, and the polymeric material is a quatropolymer of ethylene, propylene, butene and 6-methyl-1,5-heptadiene;

Such a process wherein the monomer removed is a mixture of ethylene and propylene, the solvent is perchloroethylene, and the polymeric material is a terpolymer of ethylene, propylene and 11-ethyl-1,11-tridecadiene.

and other objects which will be apparent as details or embodiments of the invention set forth hereinafter.

The accompanying drawing is a schematic flow diagram of one embodiment of the invention.

Referring to the drawing, a feed mixture of monomer, solvent and polymeric material is passed via line 11 into wiped film evaporator 12, wherein the flowing film is contacted by a counter-current flow of solvent-saturated inert gas introduced via line 19. Inert gas and monomer vapor pass via line 13 to absorber 15 of the monomer recovery system, wherein solvent-saturated inert gas is separated. Solvent-saturated inert gas is passed from absorber 15 via line 17 to compressor 18 wherein it is compressed, and then passed via line 19 to evaporator 12. The resulting mixture of solvent and polymeric material is removed from evaporator 12 via line 14 and passed to further usual processing for recovering solvent and polymeric material.

In the absorber 15, monomer is removed from the gas mixture by means of the same solvent as used in the reactor system. The rich liquor is passed via line 24 to stripper 16 wherein the monomer is stripped, lean liquor being returned via line 27 to absorber 15. Some lean liquor is passed via line 28 to thermosyphon reboiler 23 where it is partially vaporized and then via line 29 to stripper 16. Some rich liquor is passed via line 25 to the thermosyphon reboiler 22 wherein it is partially vaporized and then passed via line 26 to absorber 15. Monomer is recycled to the reactors via line 20; a purge being taken off via line 21.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

A mixture of 3% unreacted ethylene and propylene, 80% n-heptane and 17% ethylene-propylene polymeric material is fed via line 11 to the top of a wiped-film evaporator 12. The pressure is let down from reaction conditions to 20 to 40 p.s.i.g., flashing off a large portion of the monomeric ethylene and propylene. The remaining dissolved monomeric ethylene and propylene are released as the film maintained at 40° to 60° C. proceeds through the evaporator and is contacted countercurrently with the overhead stream passed from the absorber 15 via line 17. This stream from line 19 containing 75% $N_2$, 7% ethylene, and 18% heptane is equilibrated with the liquid mixture leaving the evaporator 12. At the temperature and pressure of operation, the partial pressure of ethylene at the exit from the evaporation (line 14) is so low that at most only a negligible amount, remains dissolved in the heptane-polymer solution. A low level of dissolved monomer is necesasry to avoid processing difficulties in usual down stream processing of the polymer solution. The evaporator overhead gas stream (line 13) containing 20% $N_2$, 60% ethylene and propylene monomers and 20% heptane is fed to the bottom of absorber 15 containing 20 seive trays and operating at 30 to 40 p.s.i.a. at the top. In this case, with the relative volatility of nitrogen to ethylene so large, the reboiler 22 itself provides sufficient stripping action and no additional trays are required. Lean oil at 50° C. (heptane) is fed to the top of the absorber at 40 to 50 lbs. heptane/lb. gas stream fed. Rich solvent containing 95% of the ethylene and propylene monomers fed and negligible $N_2$ is pumped from the bottom of the absorber to reflux srtipper 16. Ethylene and propylene monomers are completely stripped from the solvent in stripper 16, containing 22 seive trays. Lean solvent is recycled to the absorber. Heptane carryover in the stripper overhead ethylene and propylene gas stream is minimized by the use of a small rectifying section 16a at the top of stripper 16. One tray plus a chilled water partial condenser 16b are sufficient.

Comparative Example A

By contrast, if the same mixture (of Example 1) is fed to the evaporator without nitrogen sweep, the pressure would have to be reduced to the low pressure (high vacuum) range to get comparable residual monomer levels. For example, at 10 p.s.i.a. and 50° C., 25% of the original 3% ethylene and propylene monomers still remain in the solution at the exit of the evaporator. Higher temperature would be harmful to the heat-sensitive polymer, while lower pressures greatly increase the amount of solvent vaporized. Even at 1 p.s.i.a., about 5% of the original ethylene and propylene monomers remain dissolved.

Solvent is removed from the solvent polymer mixture by steam stripping and condensation of the solvent water mixture to recover solvent. Residual monomer decreases the bubble point of the condensate significantly. For example 0.5 wt. percent residual monomer lowers the bubble point from 190° F. to 115 °F.

Comparative Example B

A conventional absorber (without reboiler 22) is fed with a stream (line 13 of Example 1) containing 20% $N_2$, 60% ethylene and propylene monomers and 20% heptane. A liquid/vapor ratio of 40 to 50 lb. heptane/lb. gas is used to give absorptions comparable to Example 1, namely, 95% of the ethylene and propylene monomers fed. The absorber is operated at 40 p.s.i.a. with solvent entering at 125° F. While absorption of ethylene and propylene monomers is comparable to Example 1, a large portion (11%) of the $N_2$ is absorbed and leaves absorber 15 in stream 24. This high level of $N_2$ eventually finds its way back to the reactors via line 20 from stripper 16 and pressure-temperature relationships in the reactor are disturbed unfavorably.

Comparative Example C

If the gas (line 13 of Example 1), namely, 20% $N_2$, 60% ethylene and propylene monomers and 20% heptane is chilled and fed to a vapor liquid separator to separate the monomer from the sweep gas, the $N_2$ from the vapor-liquid separator contains considerable monomer and is not as suitable as a sweep gas. Also, the liquid from the separator contains considerable dissolved $N_2$. For example, the above stream (line 13) chilled to −100° F. at 40 p.s.i.a results in a vapor stream containing 45% ethylene plus propylene and 55% $N_2$ (vs. the 75% $N_2$, 18% heptane, 7% ethylene plus propylene of Examle 1) and a liquid containing 0.3% $N_2$. The liquid stream is not suitable for recycle to the reactors because of the high $N_2$ content while the vapor stream contains so much ethylene plus propylene that the liquid leaving evaporator 12 (line 14) contains an undesirable level of dissolved ethylene and propylene.

EXAMPLE 2

The procedure of Example 1 is repeated except that the feed mixture is 2% unreacted 1,3-butadiene, 80% benzene and 18% cis 1,4-polybutadiene. The wiped-film evaporator is operated at 50° to 60° C. and 20 p.s.i.a. with an inert gas sweep of 75% $N_2$ and 25% benzene from reboiled absorber 15. Butadiene is reduced to a negligible level in the polymer-solvent mixture (line 14) leaving the evaporator.

Gas from the evaporator (line 13) containing 75% $N_2$, 22% benzene and 3% 1,3-butadiene is fed to reboiled absorber 15 containing 14 absorbing trays and 2 stripping trays. Recycle benzene is fed to the top of the absorber at a rate of 4 to 5 lb. benzene/lb. gas. The absorber operates at 50 p.s.i.a. Ninety-five percent of the butadiene in the feed is absorbed. The rich liquid from the bottom of the absorber containing negligible $N_2$ is stripped of butadiene in reflux stripper 16 containing 15 trays. Butadiene-free benzene bottoms from the reflux stripper are recycled to the absorber 15. Butadiene overhead from the stripper is returned to the reactor system.

EXAMPLE 3

The procedure of Example 1 is repeated except that the feed is 4% ethylene, 1% 1-butene, 0.5% dicyclopentadiene, 19.5% of the terpolymer of ethylene, 1-butene and dicyclopentadiene, and 75% cyclohexane. Ethylene and 1-butene are removed from the mixture by use of a wiped-film evaporator as in Example 1; a similar absorption-stripping system is used except that stripper (16) has 5 or more trays in the rectifying section (to prevent excessive carryover of cyclohexane). Similar results are obtained.

EXAMPLE 4

The procedure of Example 1 is repeated except that the feed is 5% ethylene, 1% propylene, 1.0% 6-methyl-1,5-heptadiene, 1% butene, 20% quatropolymer (of these olefins), 72% octane (solvent) and similar results are obtained.

EXAMPLE 5

In this case, the feed is 2% ethylene, 0.5% propylene, 0.2% 11-ethyl-1,11-tridecadiene, 22% terpolymer (of these olefins) and 75.3% perchloroethylene, and similar results to Example 1 are obtained.

Comparable results are achieved with other solvent-monomer solutions, containing polymeric material. Inert gas flow rates may vary considerably depending on the particular system, but are in the range 0.25 to 1.50 std. cu. ft./lb. polymer.

The evaporator may be chosen from a wide variety of wiped-film devices available commercially, such as those associated with the names: Rodney-Hunt, Luwa, Kontro Film, Pfaudler or Buffalovac.

In view of the foregoing disclosure, variations and modifications thereof will be apparent to one skilled in the art, and it is intended to include within the invention all such variations and modifications except as do not come within the scope of the appended claims.

What is claimed is:

1. A process for recovering an unsaturated monomer selected from the group consisting of mono-olefins and diolefins from a solution polymerization reactor effluent comprising monomer, inert organic solvent, and polymer formed from said monomer which comprises passing said reactor effluent to a vaporization zone, countercurrently sweeping a thin film of said reactor effluent in said vaporization zone with an inert gas substantially saturated with solvent thereby removing monomer as vapor from the solvent and polymer in the film by vaporization, and passing the vaporized monomer to an absorption zone and absorbing the vaporized monomer with an inert organic solvent passed to said absorption zone.

2. A process of claim 1 wherein the inert gas is nitrogen and the gas mixture flow rate is in the range of 0.25 to 1.50 standard cubic feet per lb. of solvent plus polymeric material, the ratio of solvent being in the range of 3.0 to 6.0 parts by weight per part of polymeric material.

3. A process of claim 2 wherein the unreacted monomer mixture contains about 1 to 5% ethylene by weight.

4. A process of claim 1 wherein the solvent is the same as that in the initial solution of polymeric material.

5. A process for the recovery of unsaturated monomer selected from the group consisting of mono-olefins and diolefins from a solution polymerization reactor effluent comprising monomer, inert organic solvent, and polymer formed from said monomer, which comprises forming a thin film of the reactor effluent and countercurrently sweeping the film with an inert gas substantially saturated with solvent thereby removing monomer from the solvent and polymer in the film by vaporization, the solvent with which the inert gas is saturated being the same as that in the reactor effluent, absorbing the vaporized monomer in an inert organic solvent, and recovering monomer from the solvent by distilling.

6. A process of claim 1 wherein the solvent from which monomer has been recovered is recycled to the absorption step.

7. A process of claim 6 wherein the monomer removed is a mixture of ethylene and propylene, the solvent is n-heptane and the polymeric material is a copolymer of ethylene and propylene.

8. A process of claim 6 wherein the monomer removed is 1-3 butadiene, the solvent is benzene and the polymeric material is cis 1-4 polybutadiene.

9. A process of claim 6 wherein the monomer removed is a mixture of ethylene and 1-butene, the solvent is cyclohexane and the polymeric material is a quatropolymer of ethylene, propylene, butene and 6-methyl-1,5-heptadiene.

10. A process of claim 6 wherein the monomer removed is a mixture of ethylene and propylene, the solvent is perchloroethylene, and the polymeric material is a terpolymer of ethylene, propylene and 11-ethyl-1,11-tridecadiene.

References Cited
UNITED STATES PATENTS

| | | | |
|---|---|---|---|
| 2,161,798 | 6/1939 | Carter | 203—49 |
| 2,462,013 | 2/1949 | Waterman | 203—49 |
| 2,731,081 | 1/1956 | Mayner | 159—13 |
| 2,943,082 | 6/1960 | Cottle | 260—94.9 |
| 2,952,675 | 9/1960 | Bolle | 203—49 |
| 2,974,131 | 3/1961 | McLeod | 260—94.9 |
| 2,982,763 | 5/1961 | McLeod | 260—94.9 |
| 3,252,502 | 5/1966 | Eckardt et al. | 203—89 |

WILBUR L. BASCOMB, Jr., *Primary Examiner.*